(12) United States Patent
Greenberg

(10) Patent No.: US 8,511,484 B1
(45) Date of Patent: Aug. 20, 2013

(54) CONTAINERS AND STORAGE SYSTEM THEREFORE

(76) Inventor: Stephen Greenberg, Sherman Oaks, CA (US)

( * ) Notice: Subject to any disclaimer, the term of this patent is extended or adjusted under 35 U.S.C. 154(b) by 185 days.

(21) Appl. No.: 13/118,112

(22) Filed: May 27, 2011

Related U.S. Application Data

(60) Provisional application No. 61/349,785, filed on May 28, 2010.

(51) Int. Cl.
*A47F 7/00* (2006.01)

(52) U.S. Cl.
USPC .................. 211/49.1; 211/41.2; 211/41.11

(58) Field of Classification Search
USPC .............. 211/49.1, 13.1, 71.01, 194, 41.11, 211/42, 12, 85.15, 50, 59.4, 41.2; 206/526, 206/503, 515; 220/380; 248/309.1, 312, 248/315, 523
See application file for complete search history.

(56) References Cited

U.S. PATENT DOCUMENTS

| | | | | |
|---|---|---|---|---|
| 1,394,947 A * | 10/1921 | Singer | ........................ | 211/41.2 |
| 2,307,241 A * | 1/1943 | Sayre | ........................ | 294/158 |
| 2,606,666 A * | 8/1952 | Gray | ........................ | 211/113 |
| 2,608,305 A * | 8/1952 | Sager | ........................ | 211/49.1 |
| 2,735,552 A * | 2/1956 | Shnitzler | ........................ | 211/49.1 |
| 2,825,466 A * | 3/1958 | Shnitzler et al. | ........................ | 211/49.1 |
| 2,949,192 A * | 8/1960 | Maliff | ........................ | 211/49.1 |
| 4,008,810 A * | 2/1977 | Merz | ........................ | 211/41.2 |
| 4,183,444 A | 1/1980 | English et al. | | |
| 4,679,695 A * | 7/1987 | Leff | ........................ | 211/85.21 |
| 4,744,474 A * | 5/1988 | Tallving | ........................ | 211/133.1 |
| 4,776,469 A | 10/1988 | Geleziunas | | |
| 4,919,278 A * | 4/1990 | Howen | ........................ | 211/49.1 |
| 5,246,195 A | 9/1993 | Huff | | |
| 5,458,243 A * | 10/1995 | McBride | ........................ | 206/503 |
| D392,823 S | 3/1998 | Miller | | |
| 6,016,927 A * | 1/2000 | Krupp | ........................ | 211/126.2 |
| 6,131,746 A | 10/2000 | Huang | | |
| 6,227,387 B1 * | 5/2001 | Rose | ........................ | 211/85.29 |
| 6,328,933 B1 * | 12/2001 | Labriola et al. | ........................ | 422/564 |
| 6,648,390 B1 * | 11/2003 | Yang | ........................ | 294/161 |
| 6,854,607 B2 * | 2/2005 | Tong | ........................ | 211/70.6 |
| 8,061,536 B2 * | 11/2011 | Lin et al. | ........................ | 211/70.6 |
| 2002/0108881 A1 * | 8/2002 | Shah | ........................ | 206/526 |
| 2002/0121456 A1 * | 9/2002 | Mannion et al. | ........................ | 206/806 |
| 2007/0029213 A1 * | 2/2007 | Hall | ........................ | 206/217 |
| 2008/0290056 A1 * | 11/2008 | Hardy | ........................ | 211/126.2 |
| 2009/0020489 A1 * | 1/2009 | Lin et al. | ........................ | 211/88.01 |

\* cited by examiner

*Primary Examiner* — Darnell Jayne
*Assistant Examiner* — Hiwot Tefera
(74) *Attorney, Agent, or Firm* — QuickPatents; Kevin Prince

(57) ABSTRACT

A device is provided for neatly organizing and storing containers and lids by combining a unique attachment mechanism and hanging system. The attachment mechanism and containers and lids are uniquely designed to provide stationary and compact storage. The attachment mechanism may include a lip to ensure the containers and lids remain in their desired location. The containers and lids are centered on the device and snap together for added security. The device can be attached to counter tops, drawers, and closet doors for easy access.

13 Claims, 5 Drawing Sheets

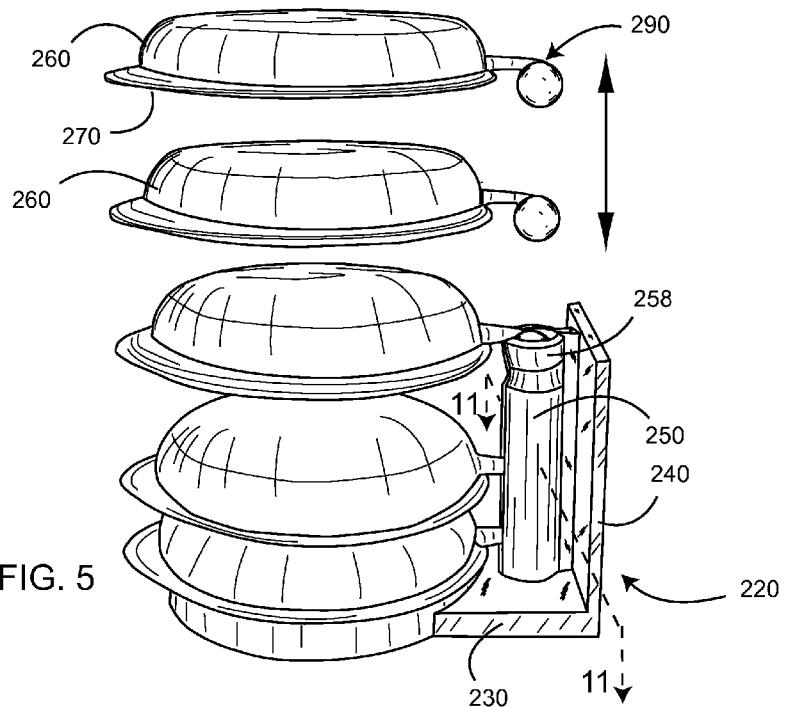
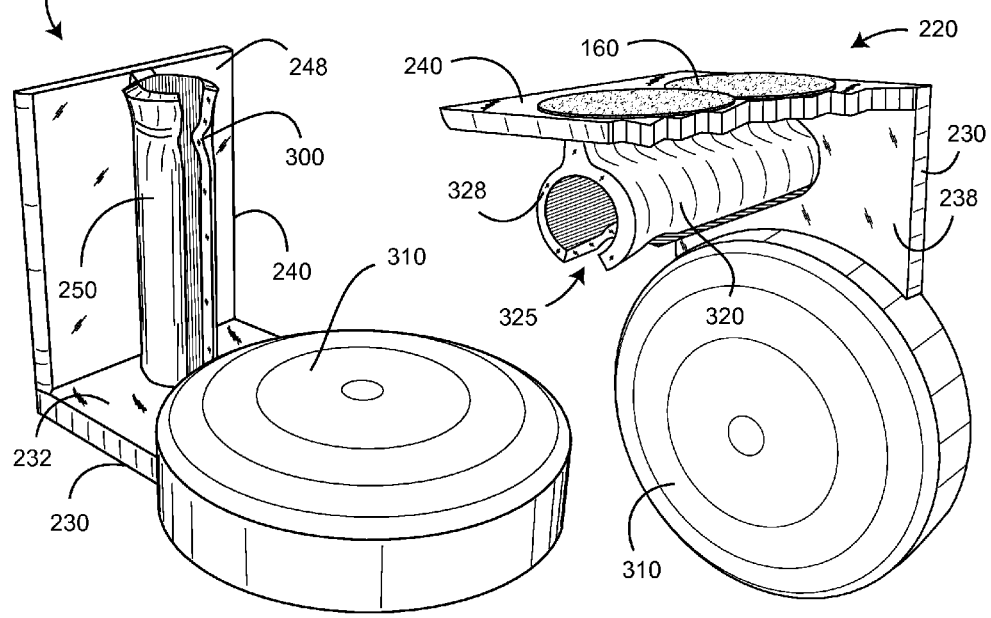
FIG. 5
FIG. 6
FIG. 7

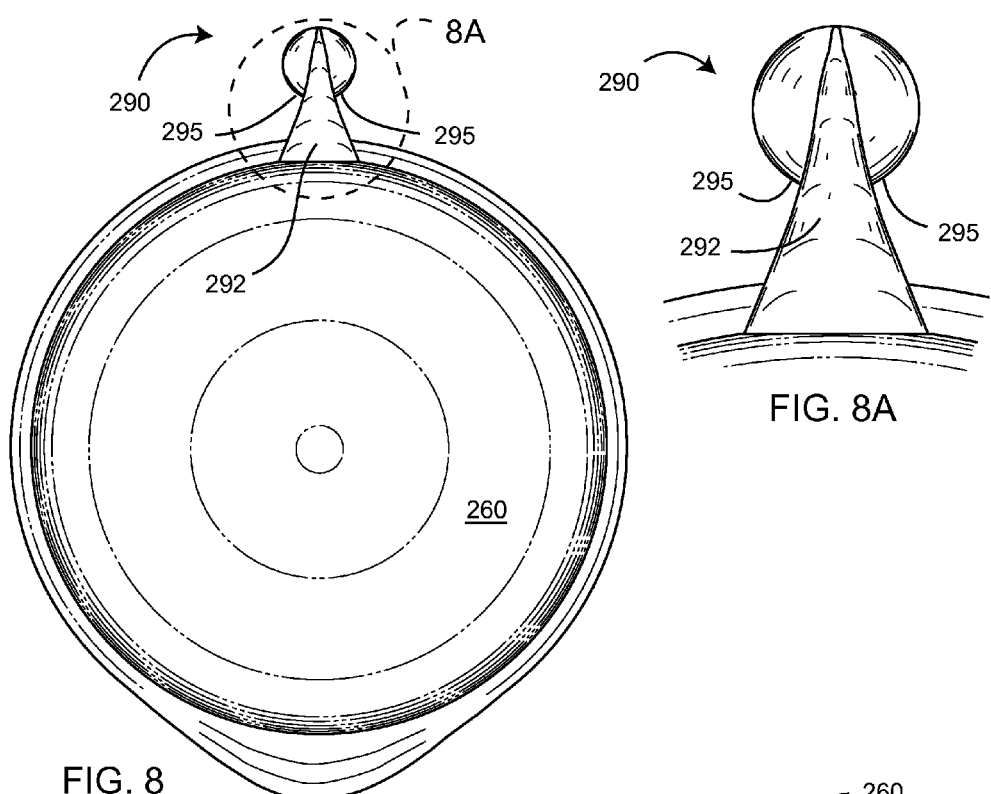
FIG. 8
FIG. 8A
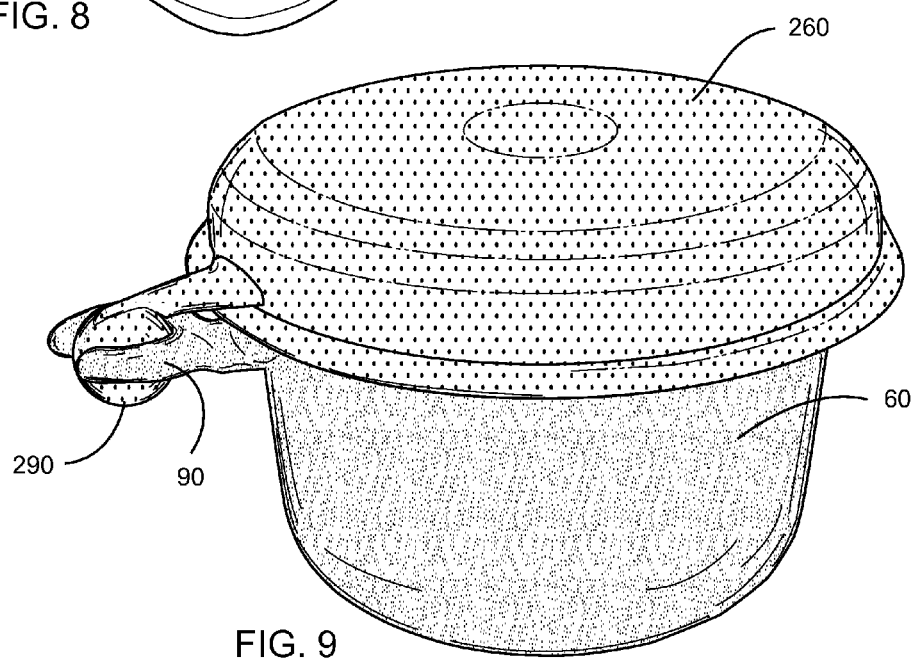
FIG. 9

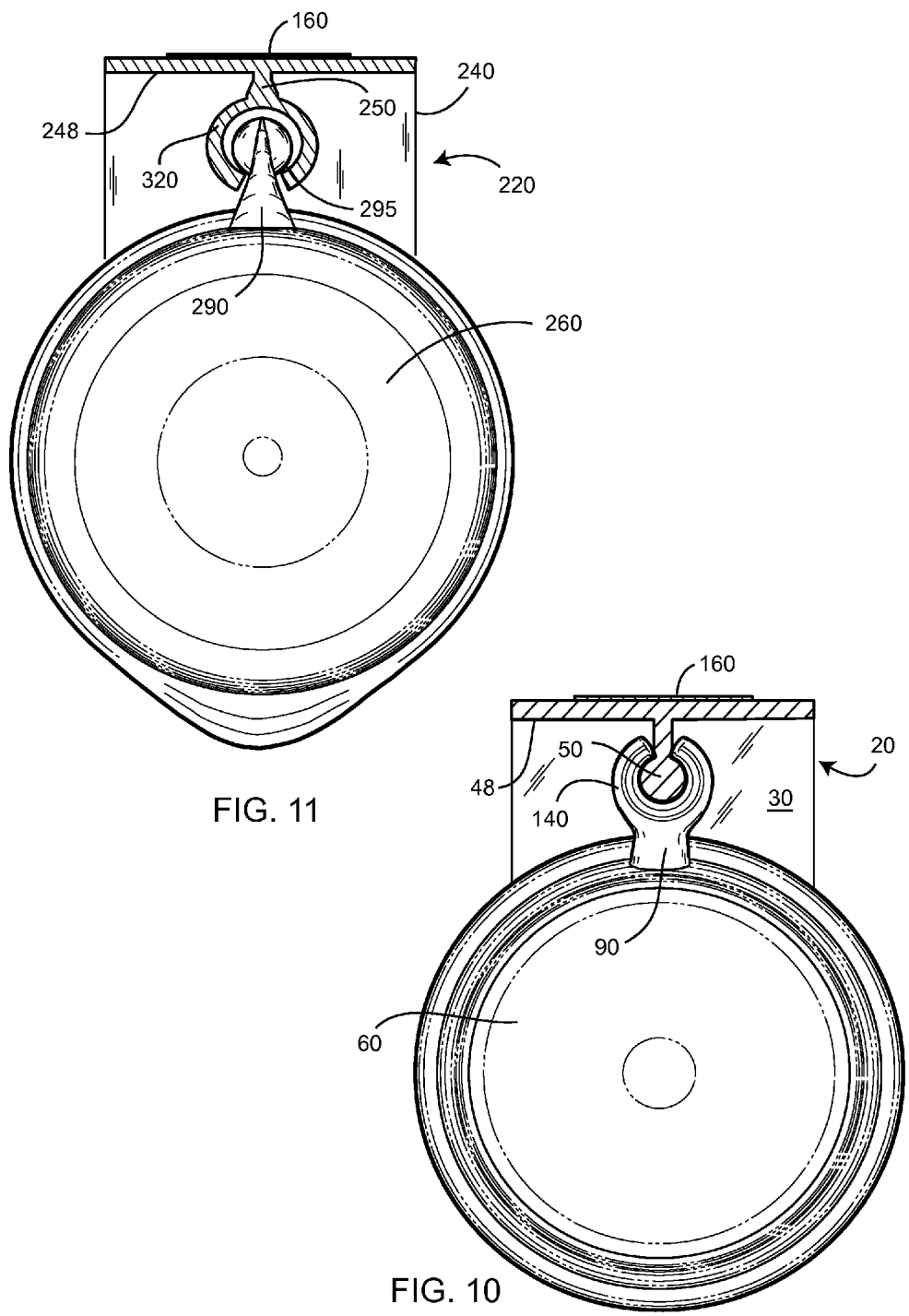

US 8,511,484 B1

CONTAINERS AND STORAGE SYSTEM THEREFORE

CROSS-REFERENCE TO RELATED APPLICATIONS

This application claims the benefit of U.S. Provisional Patent Application 61/349,785, filed on May 28, 2010, and incorporated herein by reference.

STATEMENT REGARDING FEDERALLY SPONSORED RESEARCH AND DEVELOPMENT

Not Applicable.

FIELD OF THE INVENTION

This invention relates generally to kitchenware, and more particularly, to a device which can organize food storage containers and lids compactly and securely.

DISCUSSION OF RELATED ART

As food is conveyed from raw grocery store food to leftovers in the refrigerator, several types of utensils are commonly used. For example, cookware is used to prepare the food, dishware is used to store the food, and storage containers are used to keep the food. Kitchen utensils, cookware, dishware, and storage containers come in many shapes and sizes, each having a different purpose. As such, a kitchen environment can easily become cluttered with so many types of utensils serving such different purposes. Several organizational devices have been developed to help reduce the clutter of a kitchen environment.

U.S. Pat. No. 4,776,469 to Geleziunas on Oct. 11, 1988, teaches a rack for storing lids with a base and a plurality of support members extending from the base. The base is intended for mounting on a vertical surface with the support members extending outwardly and upwardly. The support members are arranged in pairs, for locating and holding lids. Each support member has a ledge portion and a support arm extending upwardly. The ledge portions of each pair have inclined support surfaces which are inclined downwardly towards one another to center a lid.

U.S. Pat. No. 6,131,746 to Huang on Oct. 17, 2000, teaches a pot lid storing trough consisting of a bottom member and a case member movably assembled on the bottom member. The bottom member may be secured on a horizontal wall or a vertical wall in a cupboard or a cabinet, or on a wall of a kitchen, depending on the condition, with an upper open side of the case member always facing upward for putting in or taking out pot lids.

U.S. Pat. No. 4,183,444 to English et al. on Jan. 15, 1980, teaches a plastic lid for a drink cup with an integral hanger arranged for engaging a hole or slot placed in a small container for ease in carrying both the covered drink cup and the food container in one hand. The hanger either extends upwardly from the top of the lid or is a part of a flap extending from the rim of the lid.

Therefore, there is a need for a device that can store containers neatly and securely. Further, the needed device would be easily attachable to several areas inside the household for convenient access. The present invention accomplishes these objectives.

SUMMARY OF THE INVENTION

The present device provides a means of organization and storage for container-ware and or tableware using a containment platform that allows for the containers or tableware to be secured firmly together. It also provide a means to secure the containment platform in a plurality of areas and in multiple optional mounting positions, thus allowing for a means of space saving and the means of using underutilized storage areas.

The present invention comprises an L-shaped rack with a bottom and rear side. Either side can be attached to a wall, cabinet, or drawer to secure the invention. An attachment means is attached to the bottom side and secured with the rear side. A plurality of containers and lids are retained by the attachment means with unique hangar. The containers and lids have lips to snap them together while they are secured by the attachment means. A projected form is placed on the bottom side of the L-shaped rack to center the containers and lids.

The present invention is a device that can store containers neatly and securely. Further, the present device is easily attachable to several areas inside the household for convenient access. Other features and advantages of the present invention will become apparent from the following more detailed description, taken in conjunction with the accompanying drawings, which illustrate, by way of example, the principles of the invention.

DESCRIPTION OF THE DRAWINGS

FIG. 5 is a perspective view of a second rack of the invention and a plurality of lids therefore;

FIG. 6 is a bottom perspective view of the second rack without the lids;

FIG. 7 is a top perspective view of the second rack, partially broken-away, illustrating one embodiment of a mounting means;

FIG. 8 is a top elevational view of a lid;

FIG. 8A is a partial enlarged view of the hanger of the lid, as taken along line 8A of FIG. 8;

FIG. 9 is a front perspective view of a container and attached lid;

FIG. 10 is a cross-sectional view of the first rack and containers, taken generally along lines 10-10 of FIG. 1; and FIG. 11 is a cross-sectional view of the second rack and lids, taken generally along lines 11-11 of FIG. 5.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Figures 1, 2:
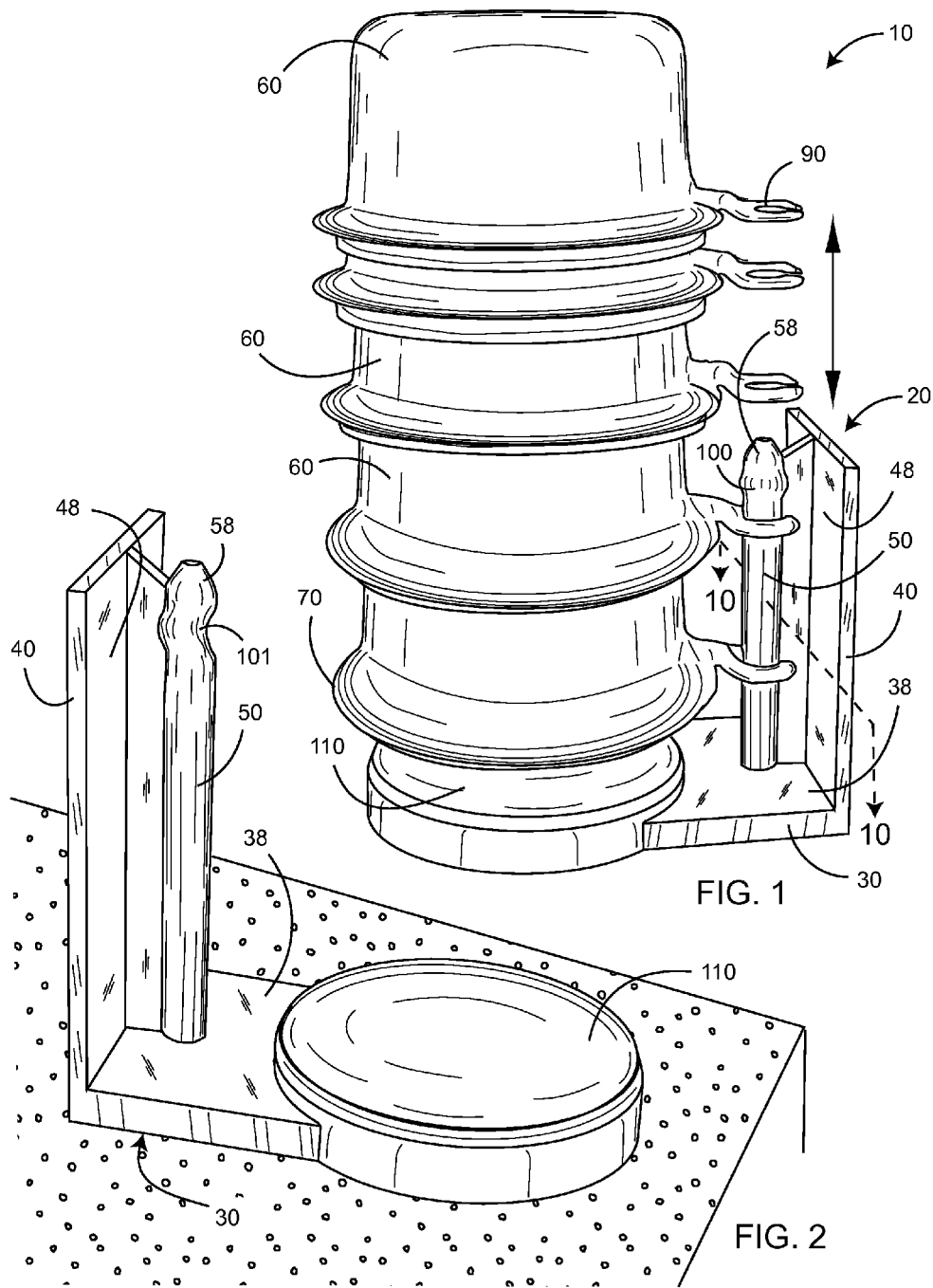
FIG. 1 is a perspective view of the invention, illustrating a first rack and containers therefore.
FIG. 2 is a perspective view of an alternate embodiment of the first rack.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list FIG. 1 illustrates a container system 10 comprising an L-shaped first rack 20 and a plurality of containers 60. The L-shaped first rack 20 comprises a bottom side 30 substantially orthogonally fixed with a rear side 40 and an elongated first slidable attachment means 50. The elongated first slidable attachment means 50 is further fixed to the rear side 40 with a front surface 48 of the rear side 40. In an alternative embodiment, the first slidable attachment means 50 of the first rack 20 is integrally formed with the rear side 40 and the bottom side 30 thereof. The first rack 20 is preferably made from a rigid, easily washed material such as plastic, wood, metal, or the like.

Each of the plurality of containers 60 has a rim 70 defining an opening 80 (FIG. 3) thereof. A first hanger 90 projects away from the rim 70 and is adapted to slidably engage the first slidable attachment means 50 of the first rack 20. The plurality of containers 60 are mutually nestable.

The first hanger 90 of each container 60 may be successively introduced to the first slidable attachment means 50 and slid towards the bottom side 38 of the first rack 20. Each successive container 60 is nested with the next adjacent container 60, the first slidable attachment means 50 cooperating with each first hanger 90 of each container 60 to retain each container 60 onto the first rack 20. The first rack 20 is mounted either horizontally with the rear side 40 up or vertically with the bottom side 30 down. Although not shown in any of the figures, each container 60 may include more than just one of the first hangers 90 projecting away therefrom.

In FIG. 1, the first slidable attachment means 50 of the first rack 20 may include a lip 100 proximate to a top end 58 thereof. When the first hanger 90 of one of the containers 60 is placed onto the first slidable attachment means 50, the lip 100 contacts the top end 58, requiring increased force to allow passage of the first hanger 90 thereby. Once it has passed the top end 58, the first hanger 90 will need increased force for it to be removed from the first slidable attachment means 50, to prevent inadvertent detachment. Alternately, in FIG. 2, the first attachment means 50 includes a jog 101 proximate the top end 58 thereof for retaining the first hanger 90 of each container 60 thereon, but maintaining a consistent thickness of the first attachment means 50. Other suitable means (not shown) for retaining the containers 60 on the first slidable attachment means 50, such as magnets, may alternately be used, provided that such means are able to be overcome by applying additional force to any container 60 that is to be removed from the first rack 20.

The top surface 38 of the bottom side 30 may include a projecting form 110 that snuggly fits inside the opening of the container 60. The projecting form 110 operates to properly position the container 60 on the bottom side 30. Each successively nested container 60 is also properly positioned with respect to the bottom side 30 of the first rack 20 due to the projecting form 110.

The first rack 20 may be set on a countertop, for example (as illustrated in FIG. 2), or fixed to a vertical or horizontal surface (FIG. 4) with a mounting means 160, such as a two-sided foam adhesive tape (FIG. 4), a hook-and-loop type fastener (not shown), mechanical screws (not shown) fixed through apertures (not shown) of the bottom side 30 or rear side 40, or other suitable mechanical fasteners. As such the first rack 20 may be set on a countertop, fixed with a countertop, wall, fixed with a lower surface of a cupboard or countertop, fixed within a drawer, or mounted to other locations as deemed suitable by the user.

Figure 3:
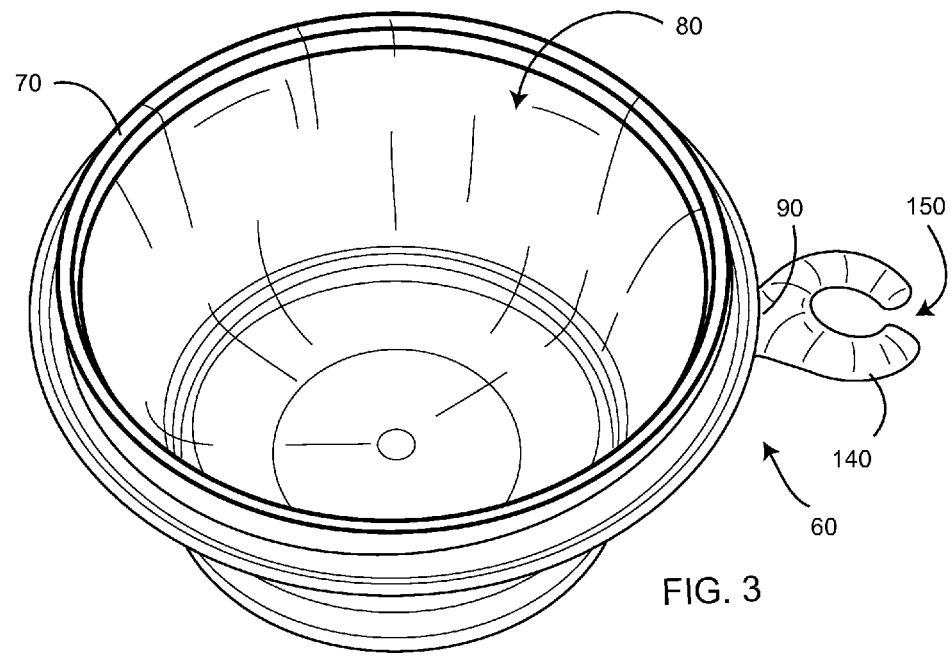
FIG. 3 is a top perspective view of one of the plurality of containers.
Figure 4:
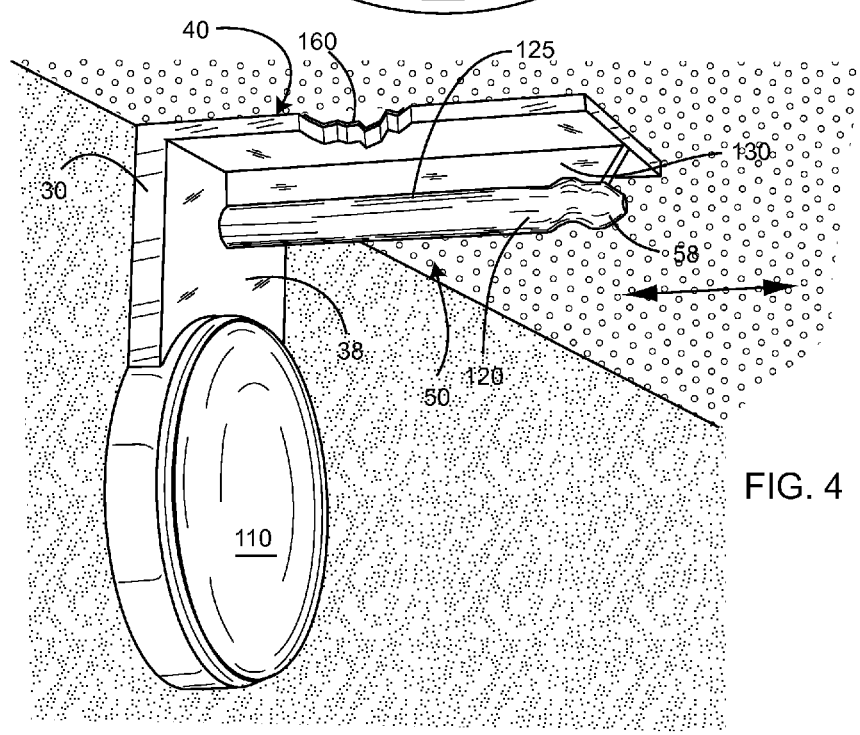
FIG. 4 is a left side perspective view of the first rack, partially broken away, as attached to a wall and bottom surface of a cupboard.

FIGS. 3 and 4 illustrate a container system 10 wherein the first slidable attachment means 50 is an elongated solid 120 having at least one shoulder 125. The elongated solid 120 is fixed with the front surface 48 of the rear side 40 with an elongated shank 130. The first hanger 90 includes a C-shaped portion 140 adapted for slidable engagement with the elongated solid 120. An open portion 150 of the first hanger 90 allows passage of the elongated shank 130 such that the C-shaped portion 140 is supported against the pull of gravity by the at least one shoulder 125 of the elongated solid 120.

In an alternative embodiment, the top end 58 of the elongated solid 120 is tapered to facilitate initial engagement of the first hanger 90 therewith. The elongated solid 120 is preferably substantially cylindrical, but may take any suitable cross-sectional shape.

FIG. 5 illustrates a container system 10 that further including an L-shaped second rack 220 and a plurality of lids 260. The L-shaped second rack 220 comprises a bottom side 230 substantially orthogonally fixed with a rear side 240 and an elongated second slidable attachment means 250. The elongated second slidable attachment means 250 is further fixed with the rear side 240 at a front surface 248 of the rear side 240. In an alternative embodiment, the second slidable attachment means 250 of the second rack 220 is integrally formed with the rear side 240 and the bottom side 230 thereof. The second rack 220 is preferably made from a rigid, easily washed material such as plastic, wood, metal, or the like.

Each of a plurality of lids 260 has a rim seal 270 interlockably engageable with the rim 70 of one of the containers 60 to seal the container 60. A second hanger 290 projects away from the rim seal 270 and is adapted to slidably engage the second slidable attachment means 250 of the second rack 220. The plurality of lids 260 are mutually nestable.

The second hanger 290 of each lid 260 may be successively introduced to the second slidable attachment means 250 and slid towards the bottom side 238 of the second rack 220. Each successive lid 260 is nested with the next adjacent lid 260, the second slidable attachment means 250 cooperating with each second hanger 290 of each lid 260 to retain each lid 260 onto the second rack 220. The second rack 220 is mounted either horizontally with the rear side 240 facing upwardly or vertically with the bottom side 230 facing downwardly.

As with the first rack 20, the second rack 220 may be set on a countertop, for example, or fixed to a vertical or horizontal surface with the mounting means 160, such as a two-sided foam adhesive tape (FIG. 7), a hook-and-loop type fastener (not shown), mechanical screws (not shown) fixed through apertures (not shown) of the bottom side 230 or rear side 240, or other suitable mechanical fasteners. As such the second rack 220 may be set on a countertop, fixed with a countertop, wall, fixed with a lower surface of a cupboard or countertop, fixed within a drawer, or mounted to other locations as deemed suitable by the user.

FIG. 6 illustrates a container system 11 comprising the second slidable attachment means 250 of the second rack 220 including a lip 300 proximate a top end 258 (FIG. 5) thereof. When the second hanger 290 of one of the lids 260 is placed onto the second slidable attachment means 250, the lip 300 contacts the top end 258, requiring increased force to allow passage of the second hanger 290 thereby. Once it has passed top end 258, the second hanger 290 will need increased force for it to be removed from the second slidable attachment means 250.

The top surface 238 of the bottom side 230 of the second rack 220 includes a projecting form 310 that snuggly fits inside the opening of the lid 260. The projecting form 310 operates to properly position the lid 260 on the bottom side 230. Each successively nested lid 260 is also properly centered with respect to the bottom side 230 of the second rack 220 due to the projecting form 310.

FIGS. 7, 8 and 8A illustrate the container system 10 wherein the second slidable attachment means 250 is an elongated C-shaped channel 320. The elongated C-shaped channel 320 is fixed with the front surface 248 of the rear side 240 of the second rack 220. The second hanger 290 includes at least a shank 292 and at least one shoulder 295 adapted for slidable engagement within the elongated C-shaped channel 320. An open side 325 of the C-shaped channel 320 allows passage of the shank 292 of each lid 260 such that the at least one shoulder 295 is supported against the pull of gravity by the C-shaped channel 320.

The top end 258 of the C-shaped channel 320 is open to allow introduction of the second hanger 290 of each lid 260 therein. In one embodiment, the first hanger 90 of each container 60 and the second hanger 290 of each lid 260 are mutually engageable (FIG. 9) to properly position and retain each lid 260 on one container 60 and to further aid in the sealing of the lid 260 to the container 60. The first hanger 90 and second hanger 290 are each shown with a mutually-cooperative shape, but such shapes may vary as desired provided that they each are engageable with their associated attachment means 50,250 and, optionally, with each other.

The first and second attachment means 50,250 may be interchanged such that the second attachment means 250 is included with the first rack 20 and the first attachment means 50 is included with the second rack 220. Likewise, the corresponding hangers 90,290 of the containers 60 and lids 260, in such an embodiment, are also be mutually interchanged. Further, while a certain form for the first and second attachment means 50,250 has been illustrated, other slidable attachment means (not shown) that incorporate magnets or other mechanical attachment means such as rails, tabs and slots, tongue-in-groove arrangements, or the like may be utilized, provided that such attachment means allow for the slidable engagement of the container 60 or lid 260 with the rack 20,220, and the subsequent nesting of the containers 60 or lids 260.

The present invention may be used for foods and other edible items. As such, the materials used are suitable for food use and are further microwave safe. It is anticipated that hot items, liquids, and other degradable items will be placed in the containers. As such, the present invention is constructed with a rigid, preferably transparent or translucent material, but also possibly opaque material, that is not damaged at temperatures associated with food preparation or storage, and that can create a tight hermetic seal. Plastic polymers, ceramics, glass, rubber, metal, paper or other materials can be used so long as they meet the above qualifications.

Moreover, herein a container 60 may take a variety of shapes different than those illustrated in the drawings. For example, the container 60 may have a square or rectangular shape when viewed from above. Further, the container 60 may also include tableware, such as a dinner plate, bowl, beverage cup or mug, or the like, and may not be associated with any particular lid 260 in such an embodiment. Further, such containers 60 are not necessarily for use only with food items, but may be used for household organization of items like office supplies, hardware such as nails and screws, arts and crafts supplies, or the like.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A container system comprising:
   an L-shaped first rack having a bottom side substantially orthogonally fixed with a rear side, an elongated first slidable attachment means fixed with a front surface of the rear side;
   a plurality of containers each having a rim defining an opening thereof, and first hanger projecting away from the rim and adapted to slidably engage the first slidable attachment means of the first rack, the plurality of containers each being mutually nestable;

an L-shaped second rack having a bottom side substantially orthogonally fixed with a rear side, an elongated second slidable attachment means fixed with a front surface of the rear side;

a plurality of lids each having a rim seal engageable with the rim of one of the containers to seal the container, and a second hanger projecting away from the rim seal and adapted to slidably engage the second slidable attachment means of the second rack, the plurality of lids each being mutually nestable;

whereby with the first rack mounted either horizontally with the rear side up, or vertically with the bottom side down, the first hanger of each container is successively introduced to the first slidable attachment means and slid towards the bottom side of the first rack, each successive container being nested with the next adjacent container, the first slidable attachment means cooperating with each first hanger of each container to retain each container onto the first rack, and whereby with the second rack mounted either horizontally with the rear side up, or vertically with the bottom side down, the second hanger of each lid is successively introduced to the second slidable attachment means and slid towards the bottom side of the second rack, each successive lid being nested with the next adjacent lid, the second slidable attachment means cooperating with each second hanger of each lid to retain each lid onto the second rack.

2. The container system of claim 1 wherein the first slidable attachment means of the first rack is integrally formed with the rear side and the bottom side thereof.

3. The container system of claim 1 wherein the first slidable attachment means of the first rack includes a lip proximate a top end thereof, whereby when the first hanger of one of the containers passes thereby the lip contacts the first hanger, requiring increased force to allow passage of the first hanger thereby.

4. The container system of claim 1 wherein a top surface of the bottom side includes a projecting form that snuggly fits inside the opening of a bottom-most of the plurality of containers to properly position the bottom-most container on the bottom side, whereby each successively nested of the plurality of containers is also properly centered with respect to the bottom side of the first rack.

5. The container system of claim 1 wherein the first slidable attachment means is an elongated solid having at least one shoulder, the elongated solid fixed with the front surface of the rear side with an elongated shank, and wherein the first hanger includes a C-shaped portion adapted for slidable engagement with the elongated solid, an open portion of the first hanger allowing passage of the elongated shank, such that the C-shaped portion is supported against the pull of gravity by the at least one shoulder of the elongated solid.

6. The container system of claim 5 wherein the top end of the elongated solid is tapered to facilitate initial engagement of the first hanger therewith.

7. The container system of claim 5 wherein the elongated solid is substantially cylindrical.

8. The container system of claim 1 wherein the second slidable attachment means of the second rack is integrally formed with the rear side and the bottom side thereof.

9. The container system of claim 1 wherein the second slidable attachment means of the second rack includes a lip proximate a top end thereof, whereby when the second hanger of one of the lids passes thereby the lip contacts the second hanger, requiring increased force to allow passage of the second hinge thereby.

10. The container system of claim 1 wherein a top surface of the bottom side of the second rack includes a projecting form that snuggly fits inside the lid to properly position the lid, whereby each successively nested lid is also properly centered with respect to the bottom side of the second rack.

11. The container system of claim 1 wherein the second slidable attachment means is an elongated C-shaped channel, the elongated C-shaped channel fixed with the front surface of the rear side of the second rack, and wherein the second hanger includes at least a shank and at least one shoulder adapted for slidable engagement within the elongated C-shaped channel, an open side of the elongated C-shaped channel allowing passage of the shank of each lid, such that the at least one shoulder is supported against the pull of gravity by the C-shaped channel.

12. The container system of claim 11 wherein a top end of the C-shaped channel is open to allow introduction of the second hanger of each lid therein.

13. The container system of claim 11 wherein the first hanger of each container and the second hanger of each lid are mutually engageable to properly position and retain each lid on one container.

* * * * *